United States Patent
Fernandez

(10) Patent No.: US 12,338,002 B2
(45) Date of Patent: Jun. 24, 2025

(54) CORRUGATED ROLLABLE TUBULAR BOOMS

(71) Applicant: UNITED STATES OF AMERICA AS REPRESENTED BY THE ADMINISTRATOR OF NASA, Washington, DC (US)

(72) Inventor: Juan M. Fernandez, Norfolk, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 693 days.

(21) Appl. No.: 17/345,440

(22) Filed: Jun. 11, 2021

(65) Prior Publication Data

US 2021/0387750 A1     Dec. 16, 2021

Related U.S. Application Data

(60) Provisional application No. 63/122,244, filed on Dec. 7, 2020, provisional application No. 63/037,839, filed on Jun. 11, 2020.

(51) Int. Cl.
*B64G 1/22*     (2006.01)

(52) U.S. Cl.
CPC .............. *B64G 1/22* (2013.01); *B64G 1/2227* (2023.08)

(58) Field of Classification Search
CPC .. E04C 3/005; E04C 3/36; B64G 1/22; B64G 1/2227; B64G 1/222
See application file for complete search history.

(56) References Cited

U.S. PATENT DOCUMENTS

| | | | |
|---|---|---|---|
| 3,508,587 A * | 4/1970 | Mauch | F16L 11/121 251/4 |
| 3,732,656 A | 5/1973 | Robinksky | |
| 3,811,633 A * | 5/1974 | Cummings | B29C 53/20 226/173 |
| 7,895,795 B1 | 3/2011 | Murphey et al. | |
| 9,863,148 B2 | 1/2018 | Fernandez | |
| 2005/0183279 A1* | 8/2005 | Wheaton | G01B 3/1003 33/755 |
| 2014/0230949 A1 | 8/2014 | Daton-Lovett | |
| 2016/0311560 A1* | 10/2016 | Geneste | H02S 30/10 |
| 2018/0313083 A1* | 11/2018 | Murphey | E04C 3/28 |
| 2020/0011057 A1 | 1/2020 | Fernandez | |

OTHER PUBLICATIONS

Xin Ning et al., "Imperfection-insensitive axially loaded thin cylindrical shells", International Journal of Solids and Structures vol. 62 (2015), Feb. 7, 2015, pp. 39-51.

(Continued)

*Primary Examiner* — Patrick J Maestri
(74) *Attorney, Agent, or Firm* — M. Bruce Harper; Robin W. Edwards; Trenton J. Roche

(57) ABSTRACT

Various embodiments provide for Corrugated Rollable Tubular Boom (COROTUB) designs. Various embodiments provide a new thin-shell tubular mast design, specifically COROTUB designs, that have unique corrugation features enabled in part by shells only affixed to each other at two respective cross-sectional end web regions.

20 Claims, 12 Drawing Sheets

(56) References Cited

OTHER PUBLICATIONS

K. Sowinski, "Buckling of shells with special shapes with corrugated middle surfaces—FEM study", Engineering Structures vol. 179 (2019), Oct. 22, 2018, pp. 310-320.

J. M. Frenandez, C. E. Volle, "Corrugated Rollable Tubular Booms", 2021 AIAA Scitech Forum, Virtual event, Jan. 11-21, 2021.

A. J. Lee, J. M. Fernandez, "Inducing bistability in Collapsible Tubular Mast booms with thin-ply composite shells", Composite Structures, Jun. 19, 2019. 225 (2019) 111166.

Iqbal et al, "Bi-Stable Composite Shells," Department of Engineering, University of Cambridge, Trumpington Street, Cambridge, CB2 1PZ, U.K., American Institute for Aeronautics and Astronautics, 2000, p. 1-8.

Guest et al., "Analytical models for bistable cylindrical shells," Department of Engineering, University of Cambridge, Trumpington Street, Cambridge CB2 1PZ, UK, The Royal Society, Published online Jan. 10, 2006, p. 839-854.

Lee et al., "Mechanics of Bistable Two-Shelled Composite Booms," University of Michigan, Ann Arbor, MI 48109, USA NASA Langley Research Center, Hampton, VA 23681, USA, AIAA SciTech Forum, Jan. 8-12, Kissimmee, Florida, 2018 AIAA Spacecraft Structures Conference, American Institute of Aeronautics and Astronautics, p. 1-24.

Fernandez, J.M. et al.,"A Simple Test Method for Large Deformation Bending of Thin High Strain Composite Flexures," 2018 AIAA SciTech Forum, pp. 1-27.

Daye, Jacob G. et al., "Structural Architectures for Imperfect Deployable Lunar Towers", Journal of Spacecraft and Rockets, 2024, pp. 1-15.

Wilkie, Keats W. et al., "An Overview of the NASA Advanced Composite Solar Sail (ACS3) Technology Demonstration Project", 2021, AIAA SciTech Forum, Virtual Event, pp. 1-25.

* cited by examiner

CORRUGATED ROLLABLE TUBULAR BOOMS

CROSS-REFERENCE TO RELATED PATENT APPLICATION(S)

This patent application claims the benefit of, and priority to, U.S. Provisional Patent Application 63/037,839, filed on Jun. 11, 2020 and U.S. Provisional Patent Application 63/122,244, filed on Dec. 7, 2020, the contents of both of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Thin-shell deployable composite booms (DCBs) are particularly attractive to the small satellite community given their high packaging volume efficiency that enables relatively large spacecraft systems required for power generation, communications, or propulsion to be housed within the small confines of these small satellite platforms. Increasing the size of these deployable systems greatly affects the capabilities of small satellites from a scientific and exploration perspective, even enabling them to travel further from Earth.

In general, the field has been focusing on further developing rollable boom concepts that use open cross-sections, like the family of Storable Tubular Extensible Member (STEM) and its variations and the Triangular Rollable And Collapsible (TRAC) boom, whose ease of manufacturing reduces overall part cost, particularly at larger scales. The high volume demands for some of the current and proposed large constellations of small satellites have only exacerbated the tendency to move towards simplistic designs and automated fabrication production.

Over the years, there have been several developments to try to improve the biggest disadvantage of open-section boom structures, which is their low torsional stiffness that can cause premature buckling, can cause low deployed accuracy and stability, and that limits their scalability. These developments range from partially or fully closing the cross-section using: discrete lacing elements; continuously bonded or stitched inner shells; interlocking teeth; elastic hinges; outer plastic or braided sleeves; friction; or mechanically or magnetically latching the two free edges of slit tubes. However, most of these designs yield a final product that either packages much less efficiently than anticipated or has a lower torsional stiffness than a true closed-section part of single construction. Also, the asymmetric nature of some of these designs reduces their load carrying capability when subjected to eccentric or asymmetric loads. Finally, in thin-walled slender booms, local imperfections, defects or asymmetries tend to limit the loading capability of the structure, particularly when subjected to compression and bending loads. Stresses tend to localized around the boundary condition furthest away from the area of load application, resulting in local wall buckling of the shell that can lead to subsequent global collapse of the structure. As such, improvements in DCBs are needed, especially to support the small satellite community and for applications where global Euler buckling of the structure is desired over a collapse that results from local instabilities.

BRIEF SUMMARY OF THE INVENTION

Various embodiments provide for Corrugated Rollable Tubular Boom (COROTUB) designs. Various embodiments provide a new thin-shell tubular mast design, specifically COROTUB designs, that have unique corrugation features. The corrugation features of the various embodiment COROTUB designs may be set to improve mechanical properties in comparison to existing state-of-the-art booms, such as Collapsible Tubular Mast (CTM) booms, enabling the extension of boom technology to larger and/or more structurally demanding deployable space structures than have been achievable by CTM booms.

Various embodiments may include a COROTUB having a coiled configuration and a deployed configuration, the COROTUB comprising: a first shell; and a second shell, wherein: the first shell is only affixed to the second shell at two respective end web regions, the first shell and the second shell curving away from each of the two respective end web regions in different directions of curvature in the deployed configuration; the first shell and the second shell flatten together in the coiled configuration in response to the two respective end web regions moving apart from one another; and at least one of the first shell and the second shell are formed such that in a cross-section of the COROTUB in the deployed configuration at least one of the first shell and the second shell have two or more corrugations.

Various embodiments may include a COROTUB having a coiled configuration and a deployed configuration, the COROTUB comprising: a first shell; and a second shell, wherein: the first shell is only affixed to the second shell at two respective end web regions, the first shell and the second shell curving away from each of the two respective end web regions in different directions of curvature in the deployed configuration; the first shell and the second shell flatten together in the coiled configuration in response to the two respective end web regions moving apart from one another; at least one of the first shell and the second shell are formed such that in a cross-section of the COROTUB in the deployed configuration at least one of the first shell and the second shell have two or more corrugations; and the first shell and the second shell are configured such that the COROTUB is stable in the deployed configuration and stable in the coiled configuration.

Various embodiments may include a rollable tubular boom having a coiled configuration and a deployed configuration, the boom comprising: a first shell; and a second shell, wherein: the first shell is only affixed to the second shell at two respective end web regions, the first shell and the second shell curving away from each of the two respective end web regions in different directions of curvature in the deployed configuration; the first shell and the second shell flatten together in the coiled configuration in response to the two respective end web regions moving apart from one another; and the first shell and the second shell are configured such that the boom has an axial curvature in the deployed configuration.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The NASA Langley Research Center (LaRC) has been developing, as part of the Deployable Composite Booms (DCB) project, a family of composite Collapsible Tubular Mast (CTM) booms that scale to the size range needed for NASA's near-term small satellite applications, including solar sails. The target boom length is 5-20 meters (m), which can be packaged on CubeSats and larger platforms. Bistable versions of these CTM booms have also been produced for the first time, for more compact and lower energy actuation systems.

Figure 1:
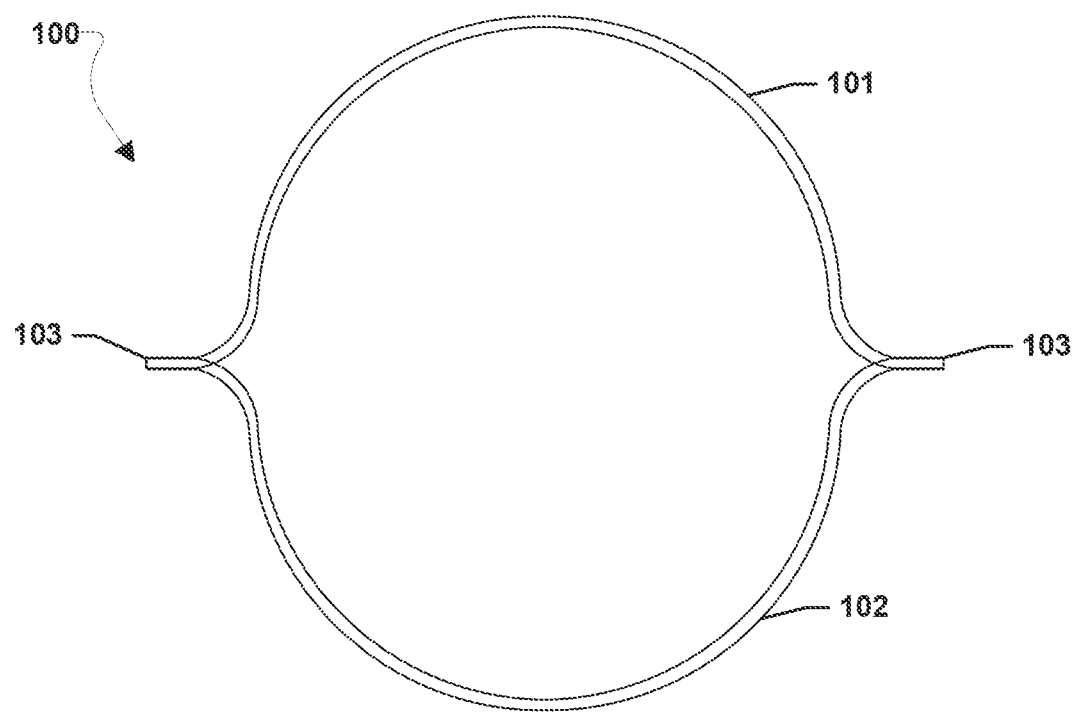
FIG. 1 is a diagram illustrating a cross-section of an example prior art Collapsible Tubular Mast (CTM) boom geometry.

The Collapsible Tubular Mast (CTM) geometry provides a monolithic closed-section tubular thin-shell structure. An example prior art CTM geometry is illustrated in FIG. 1 showing a cross-section of a CTM boom 100. The CTM geometry consists of affixing two thin-shell omega-shaped halves 101 and 102 at two flat regions on each shell edge, called the web 103. In the CTM geometry, each thin-shell omega-shaped half 101 and 102 is formed by three curved segments that are bonded at the flat region called the web 103. CTM booms are discussed in U.S. Pat. No. 9,863,148 and U.S. Patent Application Publication No. 2020/0011057, the entire contents of both of which are incorporated herein by reference for all purposes.

Traditionally, multiple-shell boom designs (two or more shells affixed), like the CTM geometry of FIG. 1, cannot increase their shell thickness without an impact to packaging efficiency. As boom designs grow in size to meet larger system applications, the structures are more prone to local wall buckling because of the low thickness-to-radius ratio (t/r) of the various shell segments that form the boom cross-section. This poses a real technology scalability limitation to prior art designs.

The various embodiments include Corrugated Rollable Tubular Boom (COROTUB) geometries. The COROTUB geometries of the various embodiments may provide a solution to the technology scalability limitations of prior art designs. By decreasing the shell radii, r, to those used on much smaller traditional boom designs, the local buckling stresses of the various shell segments, i.e. those that cause section crimpling or local snap-through, are increased significantly. Implementing a corrugated shell design can greatly increase the axial compressive and bending load capability of such elements. This can also increase the load carrying capability of the boom while it is being deployed and the root cross-sectional area is still partially developed. In fact, it can reduce the boom transition length from flat to deployed, which enables more compact deployment mechanisms and allows larger inertias exiting the deployer with the resultant increased local bearing capacity. Additionally, shell corrugations can make these structures insensitive to fabrication or loading imperfections. There are multiple intrinsic benefits identified for COROTUBs over CTMs for scalability (e.g., an increase of length and cross-sectional size to bear more load) due to the thin-wall shell corrugation (i.e., r decreases while t remains similar as cross-section scales up). Some of these benefits include additional load bearing capability, reduction in packaging volume, reduction in creep/relaxation-induced deformation when coiled (i.e. increased dimensional stability during stowage), and reduction in cure-process-induced distortion (i.e. increased dimensional stability during manufacturing), including being less sensitive to fabrication and load imperfections.

COROTUB geometries according to the various embodiments may provide a new class of deployable composite boom which may be suitable for use on large space structures or on smaller structures with more demanding structural requirements.

Figure 2A:
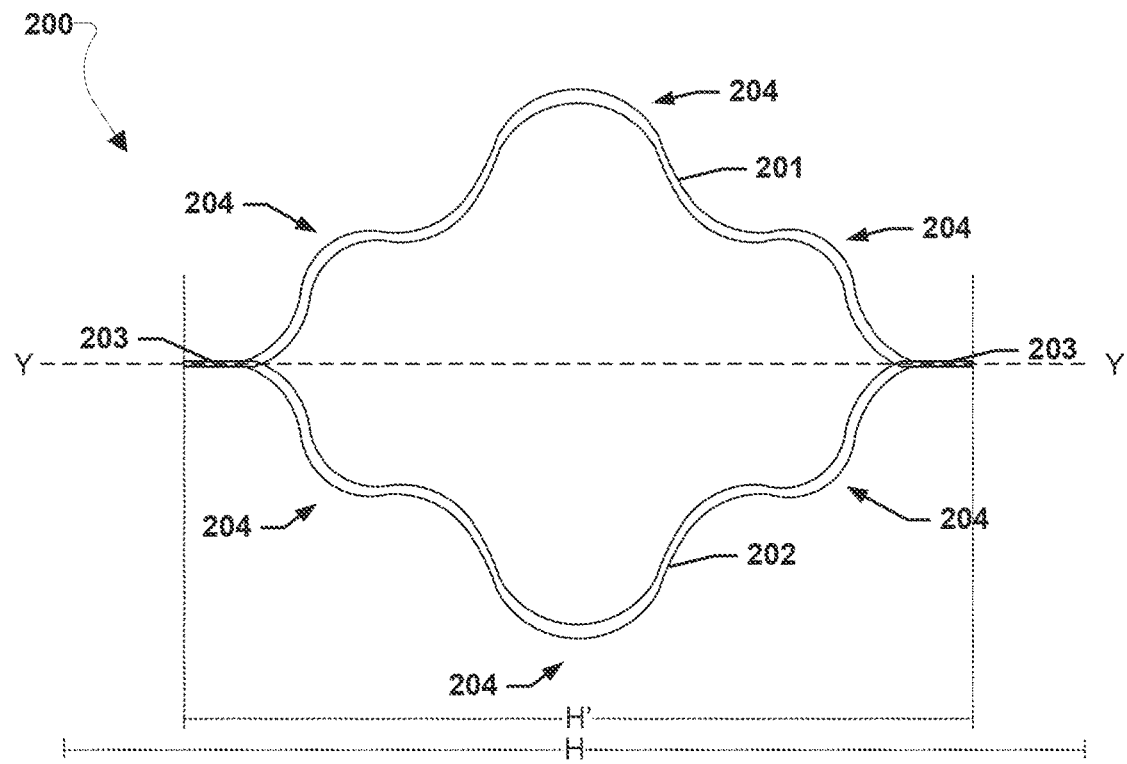
FIG. 2A is a diagram illustrating a cross-section of an example Corrugated Rollable Tubular Boom (COROTUB) geometry in a deployed configuration according to various embodiments.
Figure 2B:
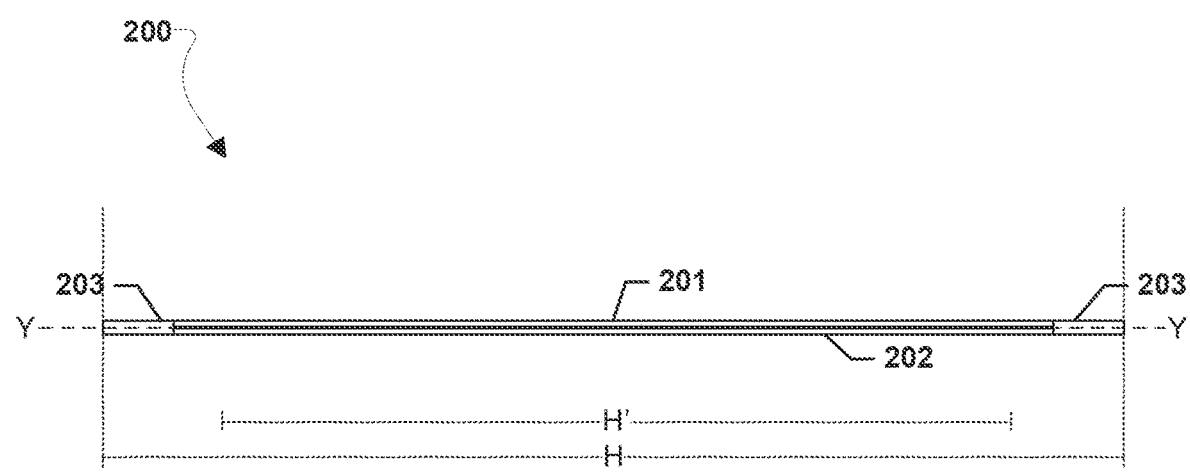
FIG. 2B is a diagram illustrating a cross-section of the COROTUB geometry of FIG. 2A in a collapsed configuration.
Figure 2C:
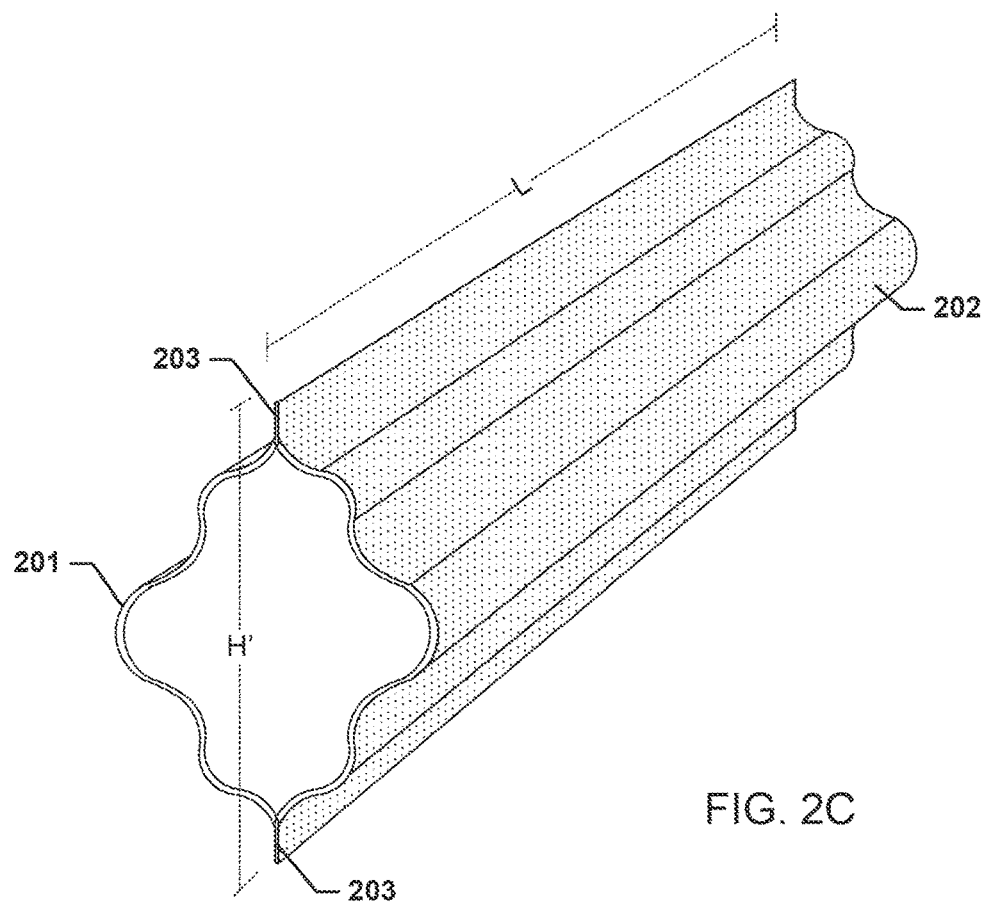
FIG. 2C is a diagram illustrating a side-perspective view of the COROTUB geometry of FIG. 2A in the deployed configuration.
Figure 2D:
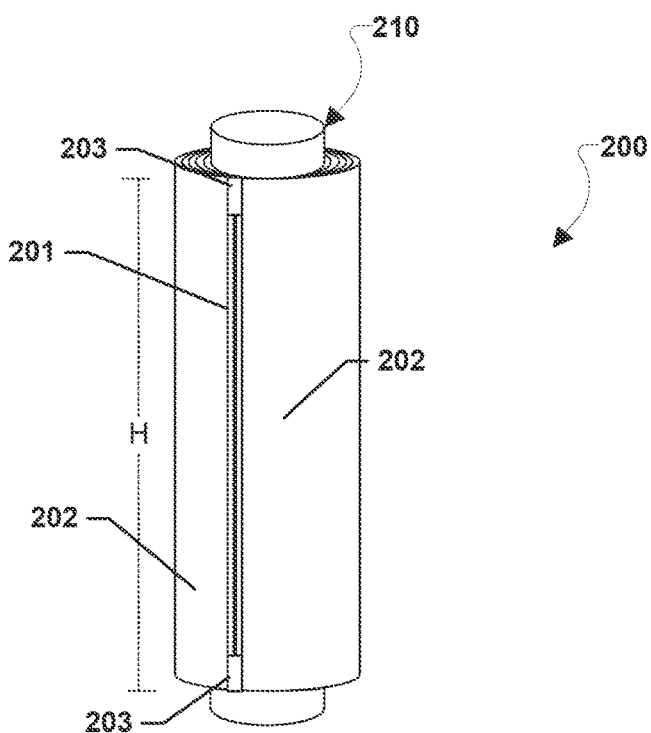
FIG. 2D is a diagram illustrating a view of the COROTUB geometry of FIG. 2A in the collapsed configuration in which the COROTUB is stored coiled around a spindle/drum.

An example of the Corrugated Rollable Tubular Boom (COROTUB) geometry according to various embodiments is illustrated in FIGS. 2A-2D. FIG. 2A shows an example cross-section of a COROTUB 200. FIG. 2B illustrates the example cross-section of the COROTUB 200 in a collapsed configuration. FIG. 2C illustrates a side-perspective view of the COROTUB 200 in the deployed configuration. FIG. 2D illustrates the COROTUB 200 in the collapsed configuration in which the COROTUB is stored coiled around a spindle/drum 210.

With reference to FIGS. 2A-2D, the COROTUB 200 consists of affixing two corrugated thin-shell halves 201 and 202 at two flat end regions on each shell edge, i.e., the web 203. In various embodiments, thin-shell halves 201 and 202 may be only affixed at the webs 203. A COROTUB according to various embodiments, such as COROTUB 200, may be configured such that in the deployed configuration (e.g., as shown in FIGS. 2A and 2C), the portions of the two corrugated thin-shell halves 201 and 202 extending from the webs 203 may curve in opposite directions from one another. In other words, the signs of the curvature of the two corrugated thin-shell halves 201 and 202 extending from the webs 203 may be different. In a COROTUB according to various embodiments, such as COROTUB 200, the webs, such as webs 203, may remain in the same plane, such as plane Y illustrated in FIGS. 2A and 2B, when the COROTUB is collapsed or deployed. The distance from the end of the webs, such as webs 203, in the collapsed plane, such as plane Y, is referred to herein as the height of the COROTUB, such as COROTUB 200. For example, that height H (also referred to as the flattened boom height) is illustrated in FIGS. 2A, 2B, and 2D. Such collapsed configuration is typically achieved when the COROTUB, such as COROTUB 200, is coiled, such as around a spindle/drum 210 or on itself (i.e., without a spindle/drum 210). In the deployed configuration the webs, such as webs 203, move toward one another in the collapsed plane, such as plane Y, thereby reducing the distance between the webs to a smaller height, such as smaller height H' illustrated in FIGS. 2A, 2B, and 2C. FIGS. 2A and 2B illustrate a comparison of the height H of the COROTUB 200 in the collapsed configuration (FIG. 2B) and the smaller height H' in the deployed configuration (FIG. 2A). In the coiled configuration, the shells 201 and 202 may flatten together as illustrated in FIG. 2B. In the coiled configuration, the shells 201 and 202 may flatten together as illustrated in FIG. 2B in response to the two respective webs 203 moving apart from one another, such as away from one another in the plane Y. In the deployed configuration the shells 201 and 202 extend away from one another to form the closed cross-section as illustrated in FIG. 2A. In various embodiments, each shell, such as shell 201 and 202, of a COROTUB may be entirely on its own respective side of the plane Y. In this manner, neither shell of the COROTUB, such as neither shell 201, 202 may extend across the plane Y in the deployed configuration.

In COROTUBs, such as COROTUB 200, segments of the two corrugated thin-shell halves, such as halves 201 and 202, may be configured as equal sense portions and/or opposite sense portions. Depending on how the COROTUB, such as COROTUB 200, is configured to collapse and/or coil, segments of either shell half, such as shell halve 201 or 202, may be equal sense portions or opposite sense portions. An equal sense portion may be a portion that has a curvature configured such that the sign of the curvature does not change while transitioning from the deployed to collapsed state. An opposite sense portion may be a portion that has a curvature configures such that the sign of the curvature changes while transitioning from the deployed to collapsed state. As an example, in the COROTUB 200 comparing the deployed configuration in FIG. 2A to the collapsed configuration in FIG. 2B and assuming the shell 202 may be the side shell half of the COROTUB 200 that may be outward to the spindle/drum (e.g., spindle/drum 210 of FIG. 2D) or already coiled surface in the coiled configuration that may be referred to as the outer shell (i.e., the shell that will be outward to coil), the convex segments of the shell 202 may coil in an equal sense way while the concave segments of that shell 202 may coil in an opposite sense way. Continuing with such an example, in the opposite manner, the concave segments of the shell 201 may coil in an equal sense way while the convex segments of that shell 201 may coil in an opposite sense way. In some embodiments, equal sense portions of a COROTUB, such as COROTUB 200, may be configured to be bistable or promote bistability and opposite sense portions of a COROTUB may be configured to be compliant. In various embodiments, COROTUBs, such as COROTUB 200, may be configured to be bistable or to promote bistability, i.e., in that it is stable in both the coiled configuration and in the deployed configuration. In various embodiments, bistable portions of COROTUBs may have larger arc lengths than monostable portions of COROTUBs.

FIG. 2C illustrates the length L of the COROTUB 200 in the deployed configuration. The length L may be any length. In some scenarios, the longer the length L in relation to the smaller height H', the greater the benefit of corrugations, such as corrugations 204, may be to the strength of the COROTUB.

The COROTUB 200 is an example configuration in which each half 201 and 202 has three corrugations 204. However, other configurations may have smaller numbers of corrugations 204 (e.g., two) or greater numbers of corrugations 204 per half 201, 202, such as four, five, six, seven, eight, nine, more than nine, etc. corrugations 204. As used herein, a corrugation, such as corrugation 204, may be a curved portion of a thin-shell half, such as halves 201 and/or 202, configured such that the corrugation has a concave and convex section (i.e., portions with opposing curvatures) and a single inflection point.

In various embodiments, a COROTUB's two corrugated thin shells, such as halves 201, 202, form a closed section, which yields high bending and torsional stiffness, allowing for high dimensional stability. The corrugation geometry that dictates the boom cross-section shape may be defined by closed-form analytical equations given a set of key design parameters. Each corrugation 204 of the COROTUB may be formed from a convex section having a radius of curvature extending out from the closed inner section of the COROTUB and a concave section having a radius of curvature extending in toward the closed inner section of the COROTUB. The COROTUB may have a collapsed configuration, such as a configuration when the COROTUB is coiled, and a deployed configuration, such as when the COROTUB is extended out along an axial length, such as to full length L in FIG. 2C.

FIG. 2D illustrates an example of the COROTUB 200 coiled around a spindle/drum 210. The coiling around the spindle/drum 210 is merely one example of the coiling of a COROTUB, and COROTUBs of the various embodiments may be configured so as to coil without the need for a spindle/drum 210. When coiling, such as around a spindle/drum 210, the shell half of the COROTUB contacting the spindle/drum 210 or already coiled surface may be referred to as the inner shell (i.e., the shell half that will be inward to the coil) and the opposite side shell half of the COROTUB that may be outward to the spindle/drum 210 or already coiled surface may be referred to as the outer shell (i.e., the shell that will be outward to coil). In the example illustrates in FIG. 2D, the shell half 201 is illustrated as the inner shell and the shell half 202 is illustrated as the outer shell. As illustrated in FIG. 2D, the coiled COROTUB 200 may be in the collapsed configuration and have the height H measured from the ends of the webs 203. While FIG. 2D may illustrate a specific diameter of the spindle/drum 210, the diameter of the spindle/drum 210 in FIG. 2D is merely an example of a diameter and not intended to be limiting in any manner. A spindle/drum in various embodiments may have larger or smaller diameter than illustrated for the spindle/drum 210. As a specific example, the diameter of the spindle/drum 210 may be selected such that the diameter is greater than about one half of the height H of the COROTUB 200 and less than about the height H of the COROTUB 200.

Figure 3:
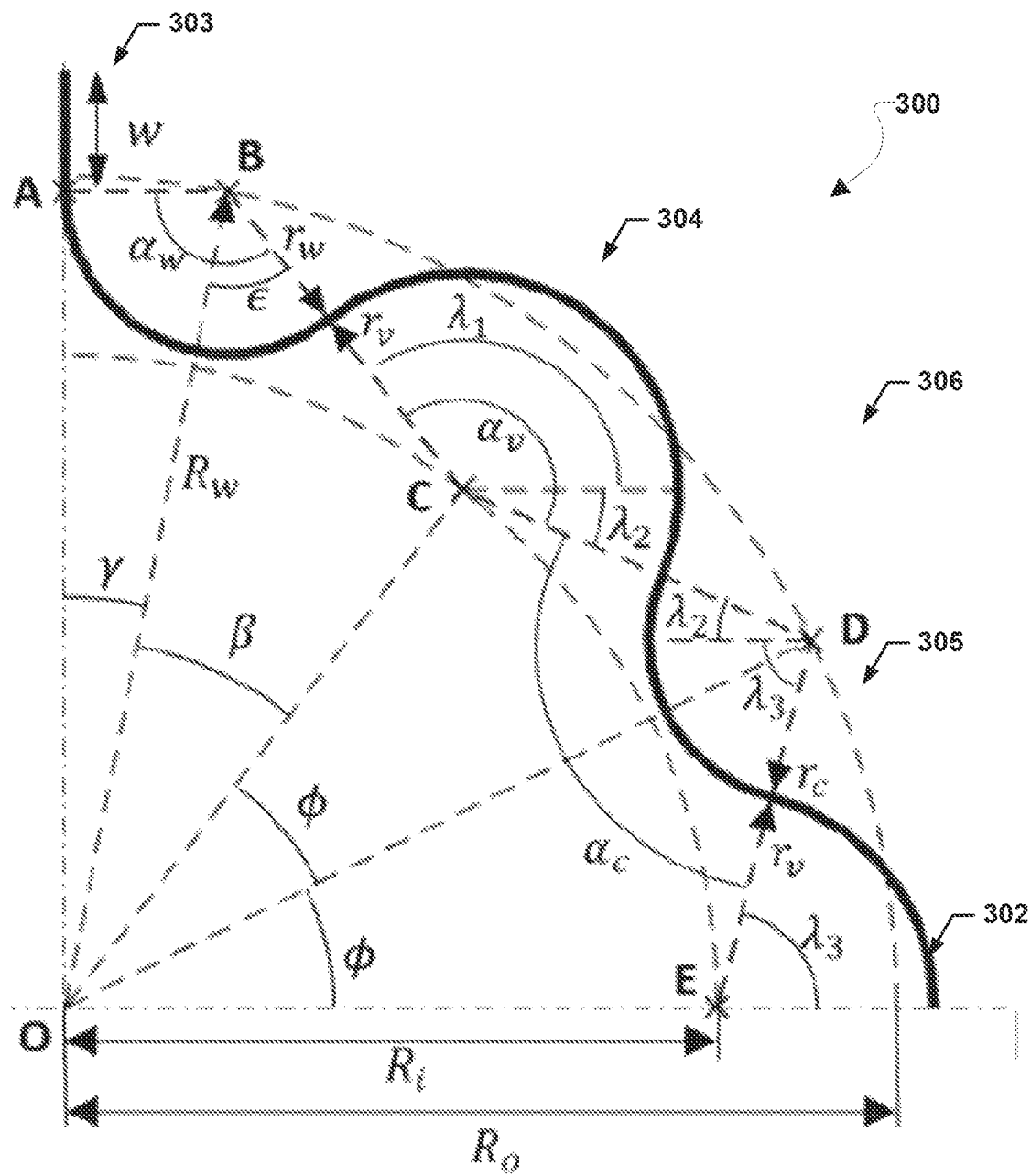
FIG. 3 illustrates a quarter portion of a double-symmetrical COROTUB cross-section for a three corrugation geometry according to various embodiments.

FIG. 3 illustrates a quarter portion 300 of a double-symmetrical COROTUB cross-section for a three corrugation geometry according to various embodiments. As an example, the quarter portion 300 may be a portion of the COROTUB 200 of FIGS. 2A-2D. The quarter portion 300 illustrates a portion of a shell 302 of the COROTUB having a web portion 303 and a corrugation 306 formed by a convex shell segment 304 and a concave shell segment 305. The quarter portion 300 illustrates the COROTUB cross-section in a deployed configuration. With reference to FIG. 3, various nomenclature as is used herein to describe attributes of the COROTUBs according to various embodiments is listed in Table 1 below.

TABLE 1

| Nomenclature | Definition |
|---|---|
| h | Flattened boom height |
| n | Number of corrugations |
| w | Web length |
| $r_w$ | Web radius |
| $\alpha_w$ | Subtended angle of web segment, create by ∠ABC |
| $r_v$ | Radius of convex shell segment |
| $r_c$ | Radius of concave shell segment |
| $\alpha_v$ | Subtended angle of convex shell segment |
| $\alpha_c$ | Subtended angle of concave shell segment |
| $r_{sh}$ | Radius of generic shell segment |
| $R_o$ | Radius of circle used for construction of the geometry, the concave segment centers lie on this circle |
| $R_i$ | Radius of circle used for construction of the geometry, the convex segment centers lie on this circle |
| $R_w$ | Distance from the origin to the center of the web radius, arc point B |
| $t_{sh}$ | Thickness of generic shell segment |
| γ | Angle between vertical axis and center of web radius arc, created by ∠AOB |

TABLE 1-continued

| Nomenclature | Definition |
|---|---|
| β | Angle between the center of web segment arc and center of corrugation segment arc C, created by ∠BOC |
| φ | Angle between any remaining convex and concave radius, here made by ∠COD and ∠DOE |
| ε | Angle created by ∠OBC |
| $\lambda_i$ | Angle created between the horizontal line stemming from a corrugation arc center and a line connecting the centers of two curved segments |

When the number of corrugations n, flattened boom height h, and web length w are set, it is possible to determine the complete cross-sectional geometry by selecting the radii of the corrugations, though an additional condition for the positioning of the web radius $r_w$ is required. These parameters are illustrated in FIG. 3.

The corrugation radii are divided into two types: concave $r_c$ and convex $r_v$. The convex radius $r_v$ and concave radius $r_c$ lie on the circles created by $R_i$ and $R_O$, respectively. All corrugation arcs are tangent to one another to create a smooth transition between them. The web radius $r_w$ is tangent to the web and the first corrugation convex radius.

For the testing described herein geometric parameters h, n, w, $r_w$, $r_c$, and $r_v$ were pre-defined. Also, one of these three conditions for the center of the arc created by $r_w$ at point B was selected such that the value of its subtended angle $\alpha_w$, the web radius arc is tangent to either the inner or outer radius $R_i$ and $R_O$, or the center of the web radius arc lies on $R_O$. In the geometry presented in FIG. 3, the center point of the web radius arc lies on $R_O$ at the point B. Undefined parameters can be determined as a relation between some other parameters, reducing the number of unknowns in the system.

A piece-wise determination of the geometry of the cross-section, i.e., step-by-step determination of the equations in the analytical model, starts with finding γ using ΔOAB. Then, ε is found using the law of cosines on ΔOBC. Given the condition where the web radius $r_w$ lies on the outer geometric circle $R_O$, $R_w$ will be equal to $R_O$. The particular web radius $r_w$ in FIG. 3 is depicted as equal to the corrugation concave radius $r_c$, though this is not a necessary condition and the equations allow for different radii. The following equations 1-9 may define aspects of the COROTUB of FIG. 3.

$$\gamma = a\sin\left(\frac{r_w}{R_w}\right) \quad (1)$$

$$\epsilon = a\cos\left(\frac{R_i^2 - (r_w + r_v)^2 - R_w^2}{-2(r_w + r_v)R_w}\right) \quad (2)$$

$$\alpha_w = \frac{\pi}{2} - \gamma + \epsilon \quad (3)$$

$$\beta = a\cos\left(\frac{(r_w + r_v)^2 - R_w - R_i^2}{-2R_wR_i}\right) \quad (4)$$

$$\phi = a\cos\left(\frac{(r_v + r_c)^2 - R_i^2 - R_O^2}{-2R_iR_O}\right) \quad (5)$$

$$\alpha_c = 2a\sin\left(\frac{R_i}{r_v + r_c}\sin\phi\right) = \lambda_2 + \lambda_3, \, \alpha_v = \alpha_c + \phi = \lambda_1 + \lambda_2 \quad (6a, 6b)$$

$$\frac{\pi}{2} = \gamma + \beta + \phi(n-1) \quad (7)$$

-continued $$h = 2[w + (r_w + r_v)\alpha_w + (r_v + r_c)(\alpha_1 + \alpha_2)] \text{ when } n = 3 \quad (8)$$

or, in general, $$h = 2\left[w + (r_w + r_v)\alpha_w + (r_v + r_c)\sum_{k=1}^{n-1}\alpha_k\right] \quad (9)$$

The angles $\gamma$ and $\epsilon$ can then be combined in Eq. 3 and 7. Law of cosines is also used to find $\phi$. Equations 1 to 6 are then plugged into Eq. 7 and Eq. 9, leaving a system of two equations with two unknown variables, $R_i$ and $R_O$, to be solved numerically. There is no single design criteria which can be tied to $R_i$ and $R_O$. A maximum horizontal boom width is not the same as $2R_O$ unless $r_v < R_O - R_i$, so it is not used as criteria.

There is a special geometric case when $R_i$ is equal to $R_O$ that reduces the equations and leaves one geometric radius to solve for directly. This new $R=R_i=R_O$ allows the equations to be rearranged allowing to solve the equations for any chosen parameter. This cannot be done when these radii are different because the restrictions on possible values of $R_i$ and $R_O$ are too difficult to predict due to the complexity of the equations. There is another special case where corrugation radii are equal, which makes the $r_c$ and $r_v$ tangent to the geometric radii $R_i$ and $R_O$, respectively. This creates the relation $r_v = r_c = r_{corrug} = R_O - R_i$.

The angles $\lambda_i$, which define the start and end angles of the arcs and used for plotting the geometry, are derived from the solved geometry. For example, the total subtended angle of the first concave corrugation (the one closest to the boom web) is the sum of $\lambda_1(=\alpha_w)+\lambda_2$, and that of first convex corrugation (not counting the web-adjacent convex correction) is $\lambda_2+\lambda_3$. These two make up the alpha, which is the subtended angle, or span of the corrugation. The general form of this is $\alpha_i = \lambda_i + \lambda_{i+1}$. To clarify, $\lambda_i$ is used for plotting, rather than solving the geometry.

While only a single shell 302 is illustrated in FIG. 3, in various embodiments the direction of the curvature of the shell 302 portion extending from the web 303, i.e., that portion represented by the subtended angle $\alpha_w$, may have an opposite direction of curvature from the second shell's portion extending from the web 303 having its own subtended angle. In this manner, the two shells of a given COROTUB may curve away from each other divergent directions from a web, such as web 303, at which the shell end portions are joined.

Figure 4:
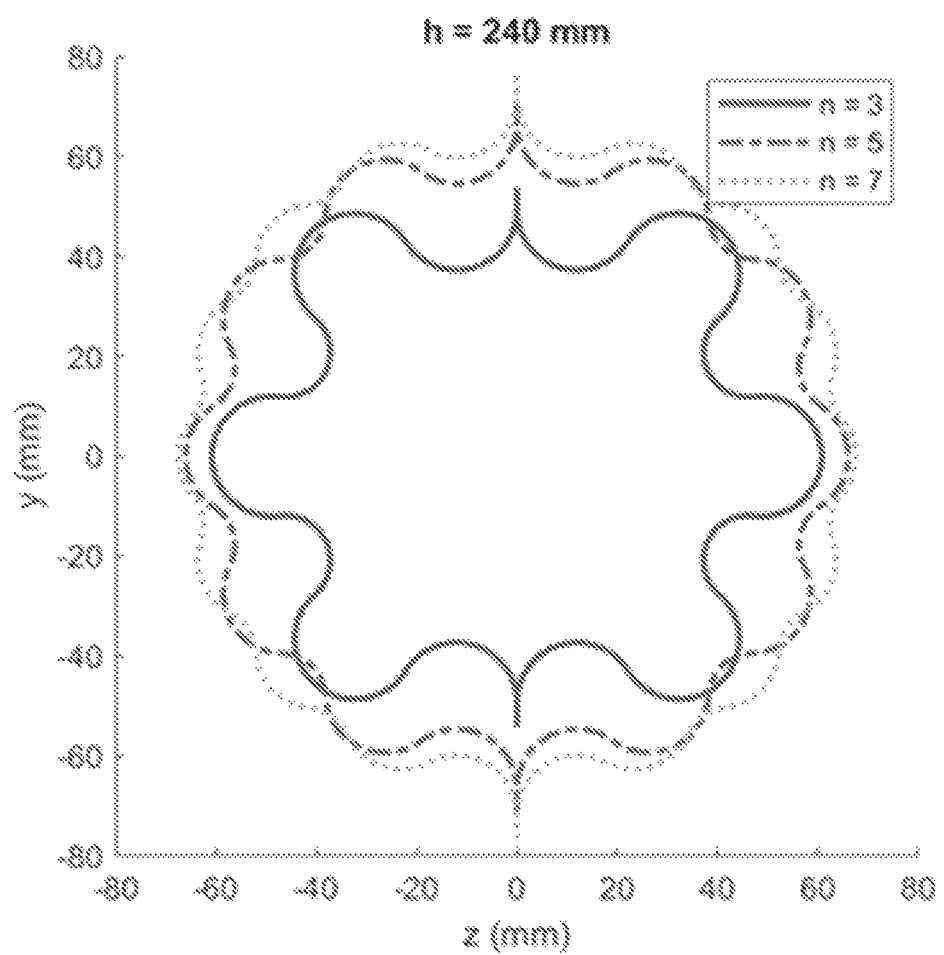
FIG. 4 illustrates three different example COROTUB cross-sections with three, five, and seven corrugations according to various embodiments.

FIG. 4 illustrates three different example COROTUB cross-sections with three (n=3), five (n=5), and seven (n=7) corrugations for each shell of the COROTUB according to various embodiments for the same boom flattened height of h=240 millimeters (mm). The cross-sections illustrated in FIG. 4 represent the deployed configuration of the COROTUB. In the coiled configuration, the COROTUB cross-section may be flat such that the two shells of the COROTUB lay flat on one another and the corrugations are not present in the cross-sectional shape.

As can be seen from FIG. 4, as the number of corrugations for shells with the same boom flattened height increases i.e., from three (n=3), to five (n=5), to seven (n=7), the arc length of each corrugation on the shell decreases such that the arc length of any one of the three corrugations in the three (n=3) corrugation COROTUB shell is greater than the arc length of any one of the seven corrugations in the seven (n=7) corrugation COROTUB shell. This translates to the shell design with the lower number of corrugations having deeper corrugations and the shell design the higher number of corrugations having shallower corrugations.

Figure 5:
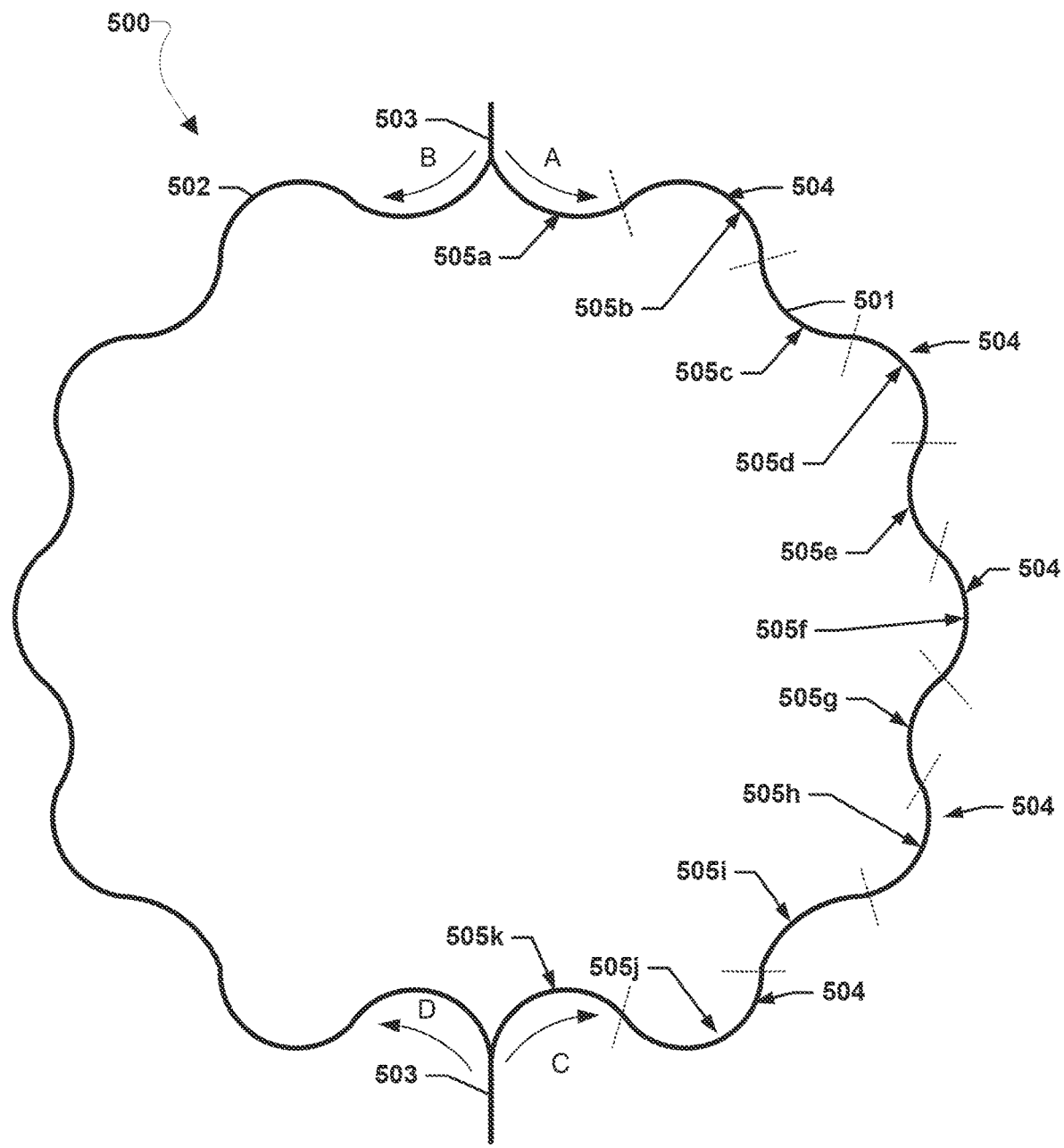
FIG. 5 is a diagram illustrating a cross-section of an example COROTUB geometry having five corrugations on both its first and second shells in a deployed configuration according to various embodiments.

FIG. 5 is a diagram illustrating a cross-section of an example COROTUB 500 having five corrugations 504 on both its first 501 and second 502 shells in a deployed configuration according to various embodiments. The COROTUB 500 may be similar to COROTUB 200 described with reference to FIGS. 2A-2D, the COROTUB of FIG. 3, and/or any of the COROTUBs illustrated in FIG. 4. With reference to FIG. 5, in the COROTUB 500, the shell 501 may be affixed to the shell 502 at the respective end web regions 503. In the COROTUB 500, the shell 501 may be affixed to the shell 502 only at the respective end web regions 503, as shown. In this manner, the COROTUB 500 may have only the two end web regions 503 joining the shells 501 and 502 and the two end web regions 503 may form the sole connection between the shells 501 and 502. In the COROTUB 500 the end web regions 503 may remain in the same plane when the COROTUB 500 is collapsed or deployed (e.g., in a manner similar as that described above with reference to plane Y illustrated in FIGS. 2A and 2B for COROTUB 200). As illustrated in FIG. 5, the curvature direction A of shell 501 may be opposite the curvature direction B of the shell 502 at one end web region 503 and the curvature direction C of shell 501 may be opposite the curvature direction D of the shell 502 at the other end web region 503 in the deployed configuration. The COROTUB 500 may be a symmetrical COROTUB 500 with the shell 501 being the mirror image of shell 502 such that each shell has five corrugations 504.

In FIG. 5, representative break-lines are illustrated on the shell 501 to represent example general delineations of portions of the shell 501, such as portions 505a, 505b, 505c, 505d, 505e, 505f, 505g, 505h, 505i, 505j, and 505k. The portions 505a and 505k may represent edge portions of the shell 501. The portions 505b, 505d, 505f, 505h, and 505j may represent convex corrugation portions of the shell 501. The portions 505c, 505e, 505g, and 505i may represent concave corrugation portions of the shell 501. While FIG. 5 illustrates two five corrugation shells 501, 502, any number of two or greater corrugations may be present in a COROTUB according to various embodiments. As such, any COROTUB according to the various embodiments may include at least one shell having two or more corrugations in the deployed configuration, such that the COROTUB has two edge portions, at least two convex corrugation portions, and at least one concave corrugation portion in the deployed configuration.

In some embodiments, all portions 505a, 505b, 505c, 505d, 505e, 505f, 505g, 505h, 505i, 505j, and 505k may be formed from the same laminate. In some embodiments, different portions of the shell 501 may be formed from different laminates. As one example, edge portions 505a and 505k may be formed from a different laminate than the portions 505b-j. As another example, some or all of the edge portions 505a and/or 505k and some or all of the concave corrugation portions 505c, 505e, 505g, and/or 505i may be formed from a first laminate and some or all of the convex corrugation portions 505b, 505d, 505f, 505h, and/or 505j may be formed from a second laminate.

In some embodiments, all portions 505a, 505b, 505c, 505d, 505e, 505f, 505g, 505h, 505i, 505j, and 505k may be bistable. In some embodiments, all portions 505a, 505b, 505c, 505d, 505e, 505f, 505g, 505h, 505i, 505j, and 505k may be compliant. In some embodiments, some portions of the shell 501 may be compliant while others are bistable. As one example, shell segments that will be coiled in an opposite-sense way may be compliant or bistable and shell segments that will be coiled in an equal-sense way may be bistable. As another example, some or all of the edge portions 505a and/or 505k may be bistable or compliant, some or all of the concave corrugation portions 505c, 505e, 505g, and/or 505i may be bistable or compliant, and some or all of the convex corrugation portions 505b, 505d, 505f, 505h, and/or 505j may be bistable or compliant. In various embodiments, the bistablility and/or compliance of various portions of shells 501 and 502 (e.g., portions 505a, 505b, 505c, 505d, 505e, 505f, 505g, 505h, 505i, 505j, and/or 505k) may be configured such that the COROTUB 500 may be bistable, i.e., stable in both the coiled configuration and the deployed configuration.

In the COROTUB 500, segments of the shells 501 and/or 502 may be configured as equal sense portions and/or opposite sense portions. Depending on how the COROTUB 500 is configured to collapse and/or coil, segments of either shell half 501 and/or 502 may be equal sense portions or opposite sense portions. An equal sense portion may be a portion that has a curvature configured such that the sign of the curvature does not change while transitioning from the deployed to collapsed state. An opposite sense portion may be a portion that has a curvature configures such that the sign of the curvature changes while transitioning from the deployed to collapsed state. As an example, in the COROTUB 500 assuming the shell 501 may be the side shell half of the COROTUB 500 that may be outward to the spindle/drum or already coiled surface in the coiled configuration that may be referred to as the outer shell (i.e., the shell that will be outward to coil), the convex segments of the shell 501 (i.e., segments 505b, 505d, 505f, 505h, and 505j) may coil in an equal sense way while the concave segments (i.e., 505c, 505e, 505g, and 505i) and edge portions (e.g., 505a and 505k) of that shell 501 may coil in an opposite sense way.

While FIGS. 2A-2D, 4, and 5 illustrate symmetric COROTUBs in which both shells have the same cross-section shape in the deployed configuration, embodiments may include asymmetric COROTUB geometries in which each shell has a different cross-section shape in the deployed configuration. FIGS. 6A-9 illustrate cross-section shapes of example asymmetric COROTUB geometries in deployed configurations, according to various embodiments. While FIGS. 6A-9 illustrate examples of different asymmetric COROTUB geometries in deployed configurations, the various embodiments are not limited to such examples and different shells of a COROTUB may have different numbers or corrugations, different shells of a COROTUB may have different cross-section shapes, and/or different shells of a COROTUB may have other combinations of different cross-section shapes in the various embodiments.

Figure 6A:
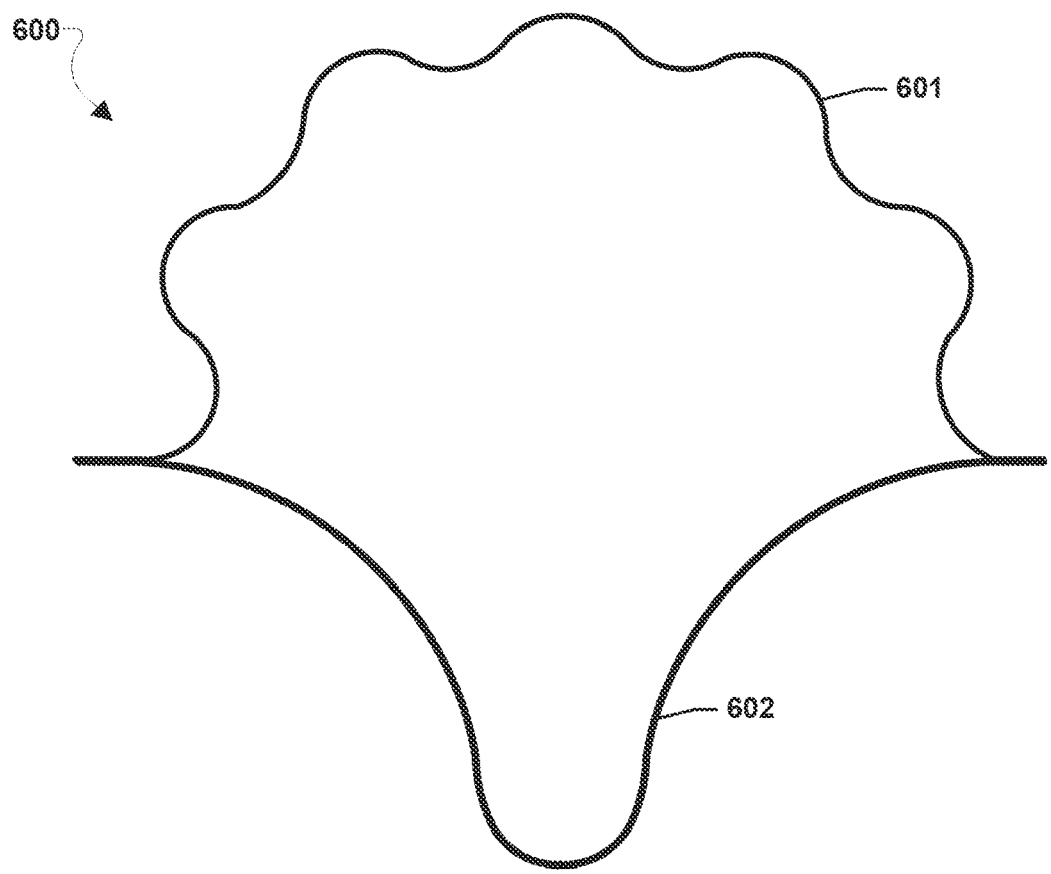
FIGS. 6A-9 illustrate cross-section shapes of example asymmetric COROTUB geometries in deployed configurations according to various embodiments.
Figure 6B:
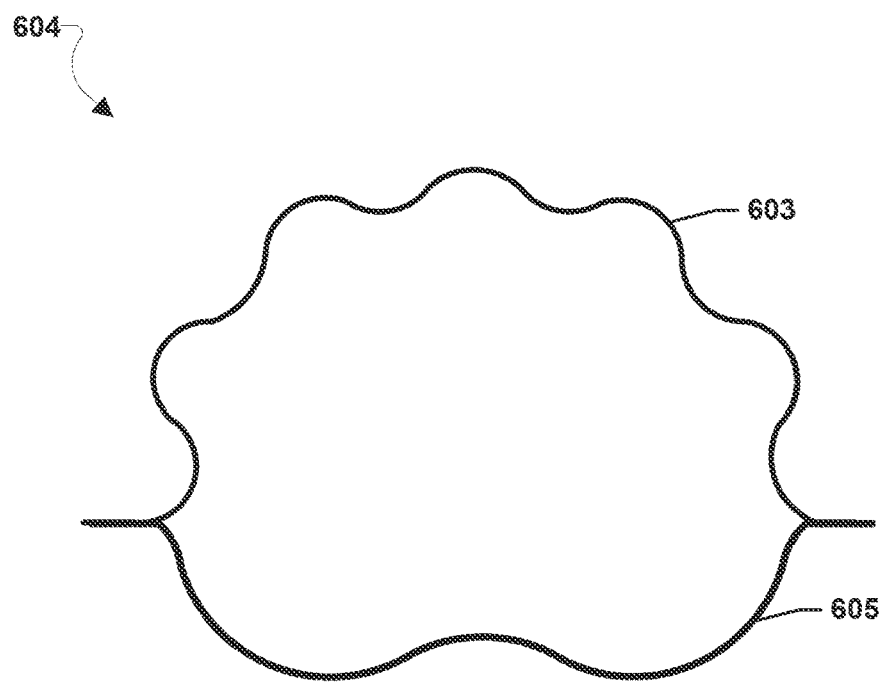
Figure 6C:
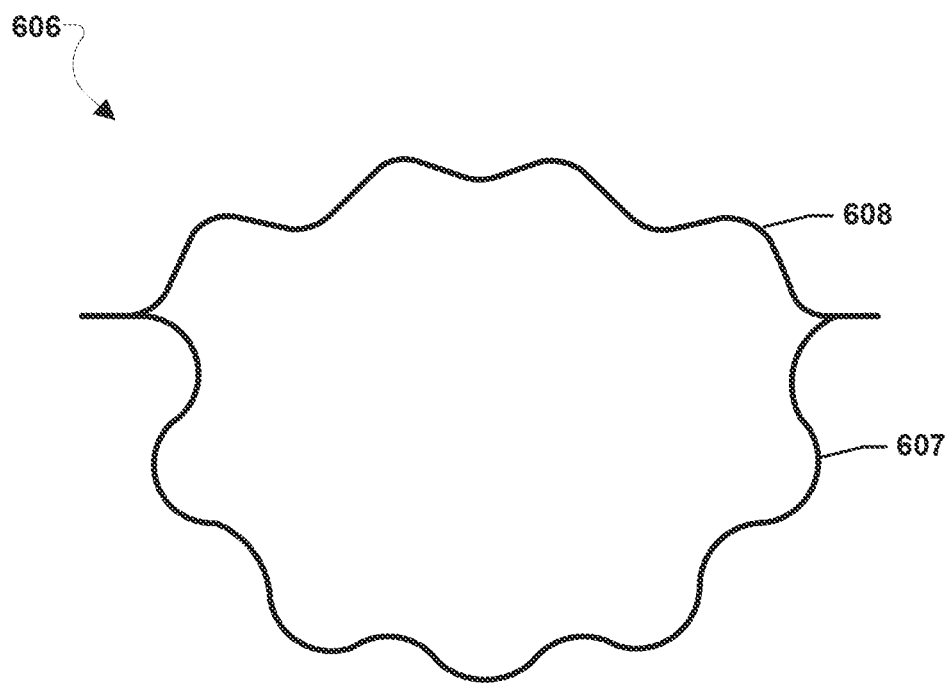
Figure 6D:
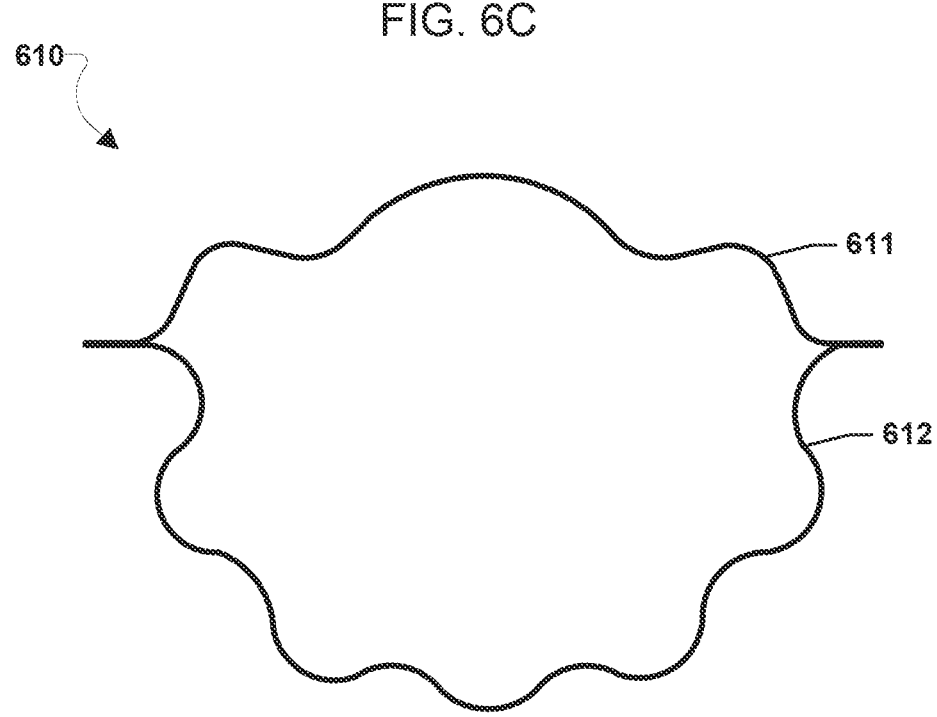
Figure 7:
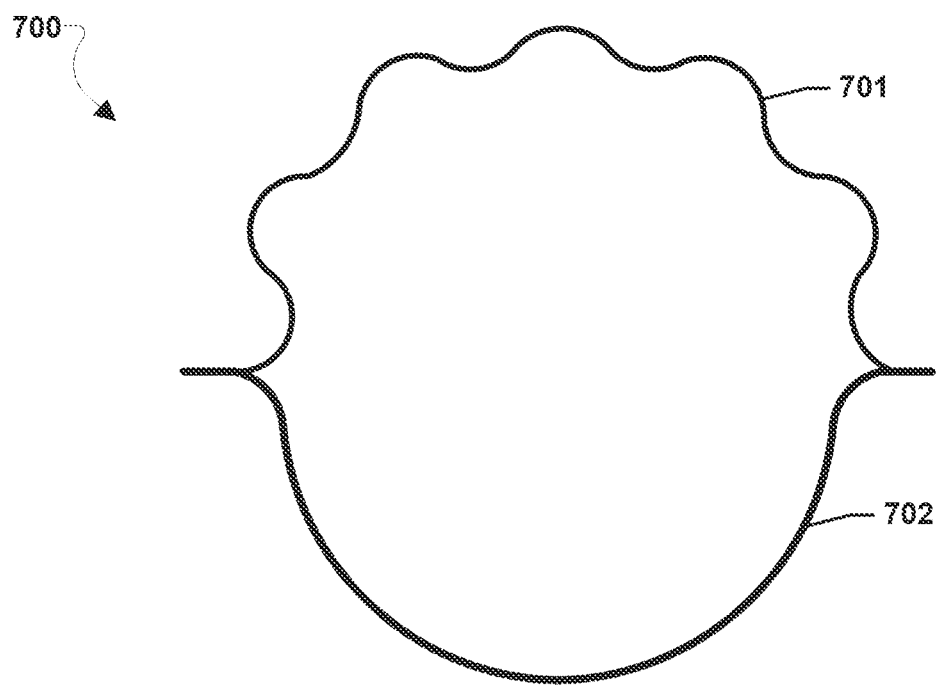
Figure 8:
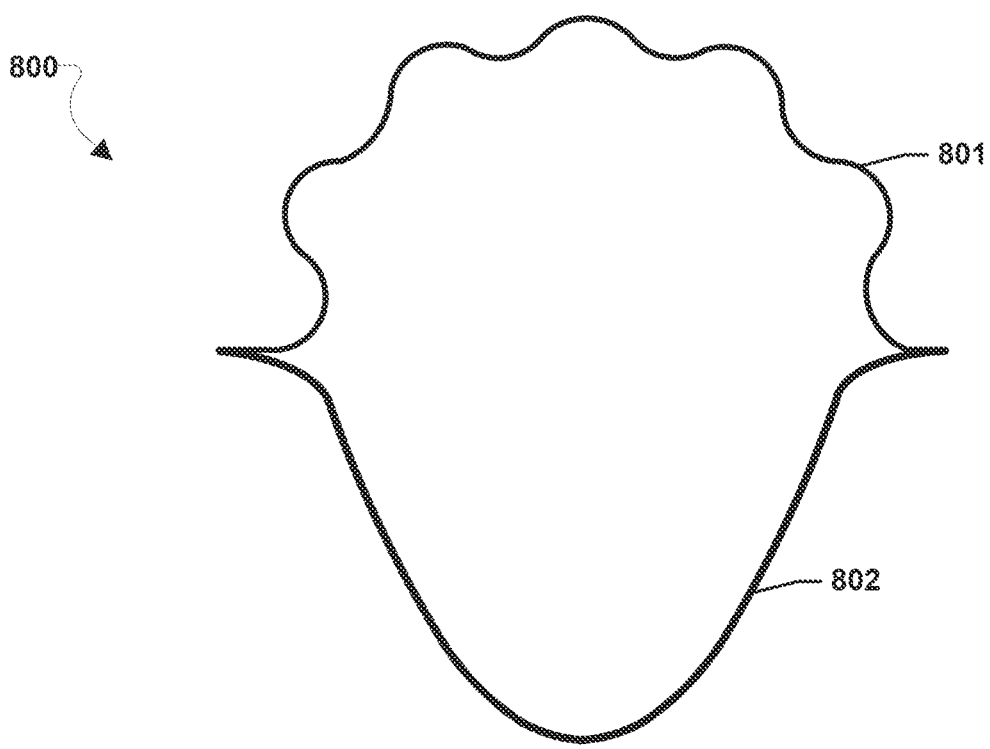
Figure 9:
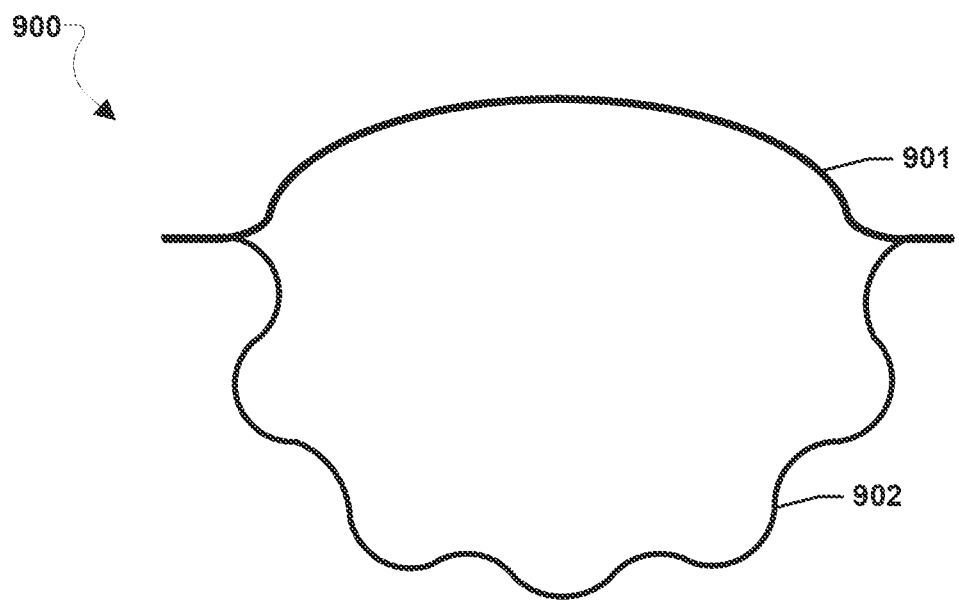

FIG. 6A illustrates a cross-section shape of COROTUB 600 with one corrugated shell 601 having five corrugations and another shell 602 that is a cross-section shape formed by three circular arcs (called for reference herein a circular cross-section). The circular cross-section shape of shell 602 is one example of a non-corrugated cross-section shape. FIG. 6B illustrates a cross-section shape of COROTUB 604 with one corrugated shell 603 having five corrugations and another corrugated shell 605 having two corrugations. FIG. 6C illustrates a cross-section shape of COROTUB 606 with one corrugated shell 607 having five corrugations and another corrugated shell 608 having four corrugations. Additionally, FIG. 6C illustrates a geometry of a shell according to various embodiments, such as shell 608, in which the corrugations of the shell are not circular corrugations. For example, the corrugations of shell 608 may be parabolic corrugations. Additionally, while parabolic corrugations are illustrated in FIG. 6C, the corrugations according to various embodiments may be other shaped corrugations, such as elliptical shape corrugations or any other shapes of corrugations suitable for the application. FIG. 6D illustrates a cross-section shape of COROTUB 610 with one corrugated shell 612 having five corrugations and another corrugated shell 611 having three corrugations. Additionally, FIG. 6D illustrates a geometry of a shell according to various embodiments, such as shell 611, in which the corrugations of the shell are combination of two different shape corrugations, such as one circular corrugation and two parabolic corrugations as illustrated for shell 611. Additionally, while a combination of circular (or substantially circular) and parabolic (or substantially parabolic) corrugations are illustrated in FIG. 6D for shell 611, the corrugations on any given shell may be any combinations of two or more different shapes, such as parabolic, circular, and/or elliptical shape corrugations. FIG. 7 illustrates a COROTUB 700 with one corrugated shell 701 having five corrugations and another shell 702 having a circular cross-section shape. The circular cross-section shape of shell 702 may be different than the circular cross-section shape of shell 602. The circular cross-section shape of shell 702 is another example of a non-corrugated cross-section shape. FIG. 8 illustrates a COROTUB 800 with one corrugated shell 801 having five corrugations and another shell 802 having a cross-section shape that may be formed by three parabolic arcs (called for reference herein generally as a parabolic cross-section). The parabolic cross-section shape of shell 802 is a further example of a non-corrugated cross-section shape. FIG. 9 illustrates a COROTUB 900 with one corrugated shell 902 having five corrugations and another shell 901 having a cross-section shape that may be formed by three ellipsoidal arcs (called for reference herein generally as an ellipsoidal cross-section). The ellipsoidal cross-section shape of shell 901 is a yet further example of a non-corrugated cross-section shape. While FIGS. 6A-9 illustrate examples of different COROTUB geometries in deployed configurations and/or different specific shell configurations, the various embodiments are not limited to such example shell shapes and different shells of a COROTUB may have different shapes, such as corrugations on a shell that may be only combinations of two or more circular segments (in cross section) forming corrugations on the shell, corrugations on a shell that may be only combinations of two or more parabolic segments forming corrugations on the shell, corrugations on a shell that may be only combinations of two or more elliptical segments forming corrugations on the shell, corrugations on a shell that may be combinations of two or more circular, parabolic, and/or elliptical segments forming corrugations on the shell, etc.

Figure 10:
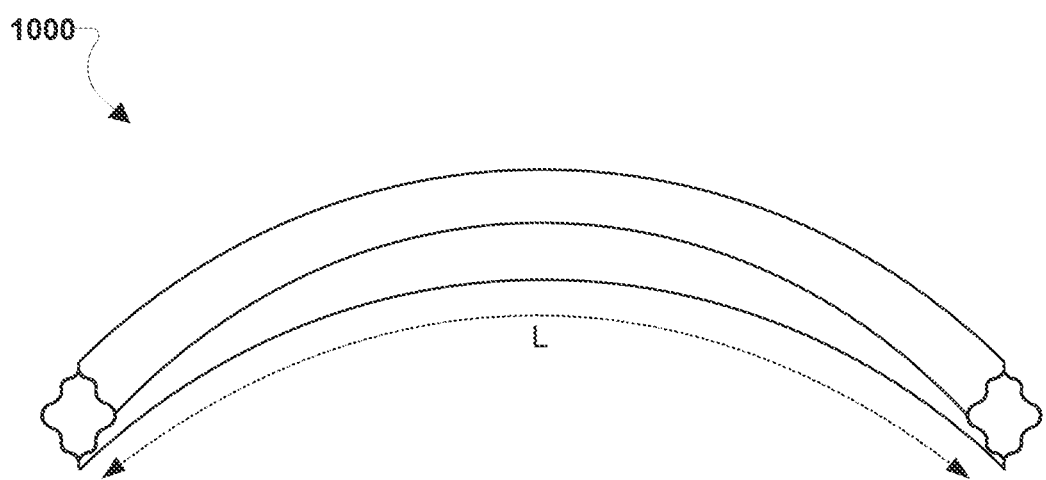
FIG. 10 illustrates a side view of a curved COROTUB in the deployed configuration according to various embodiments.

FIG. 10 illustrates a side view of a curved COROTUB 1000 in the deployed configuration according to various embodiments. While illustrated as a symmetric COROTUB 1000 with three corrugations per shell, any COROTUB according to the various embodiments, asymmetric or symmetric, may be curved. A curved COROTUB may have curvature along its length L. The axial curvature (or longitudinal curvature) may enable deployed COROTUBs of the various embodiments to form arches. Additionally, while illustrated as a COROTUB, in various embodiments the deployed boom need not be a COROTUB, but may be a CTM, such as a CTM boom described with reference to FIG. 1. In a boom having axial curvature according to the various embodiments, such as COROTUB 1000 or any other type axial curved boom, the end web regions of the boom may be in the same the same plane in the collapsed and deployed configurations (e.g., in a manner similar as that described above with reference to plane Y, as illustrated in FIGS. 2A and 2B for COROTUB 200), but the end web regions may curve along the length of the boom, such as length L, such that the web regions represent concentric curves along the length of the boom, such as length L.

Figure 11:
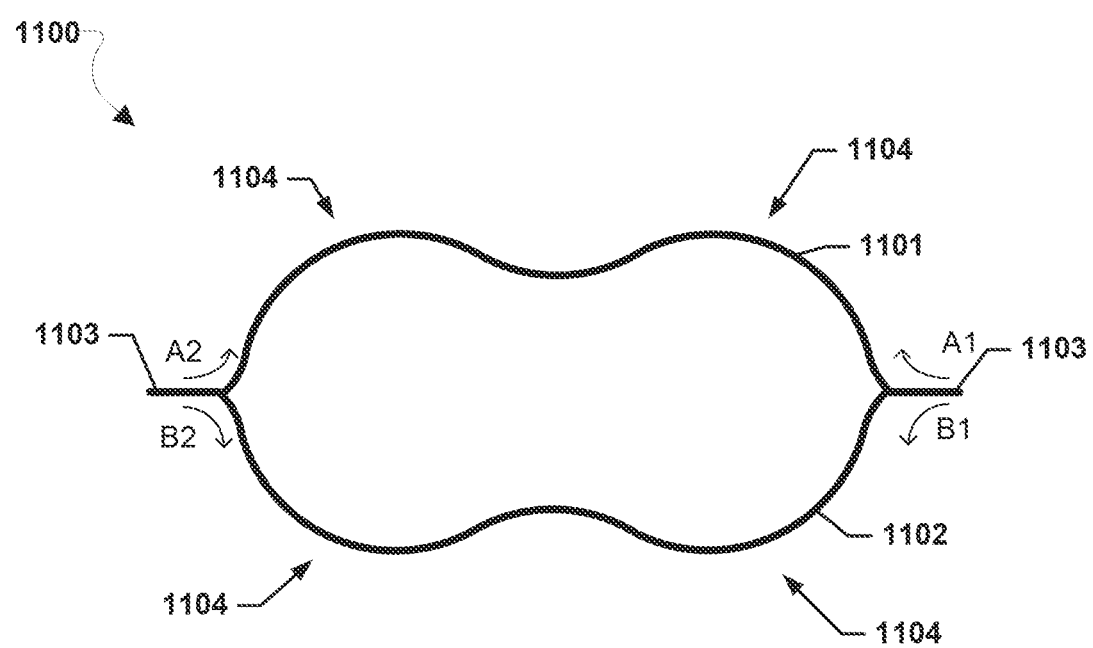
FIG. 11 is a diagram illustrating a cross-section of an example COROTUB geometry having two corrugations on both its first and second shells in a deployed configuration according to various embodiments.

FIG. 11 is a diagram illustrating a cross-section of an example COROTUB 1100 having two corrugations 1104 on both its first 1101 and second 1102 shells when in a deployed configuration, according to various embodiments. The shells 1101 and 1102 may be affixed together at two respective end web regions 1103, as shown. In the COROTUB 1100, the shell 1101 may be affixed to the shell 1102 only or solely at the respective end web regions 1103. In this manner, the COROTUB 1100 may have only the two end web regions 1103 joining the shells 1101 and 1102 and the two end web regions 1103 may form the sole connection between the shells 1101 and 1102. In the COROTUB 1100 the web end regions 1103 may remain in the same plane when the COROTUB 1100 is collapsed or deployed (e.g., in a manner similar as that described above with reference to plane Y illustrated in FIGS. 2A and 2B for COROTUB 200). FIG. 11 illustrates the direction of angle A1 for the curvature of shell 1101 from one web 1103 being in a different sign direction from the direction of angle B1 for the curvature of shell 1102 from that same web 1103. Similarly, FIG. 11 illustrates the direction of angle A2 for the curvature of shell 1101 from one web 1103 being in a different sign direction from the direction of angle B2 for the curvature of shell 1102 from that same web 1103. Additionally, the curvature directions of A2 and B1 may be the same sign and the curvature directions of A1 and B2 may be same sign.

Figure 12:
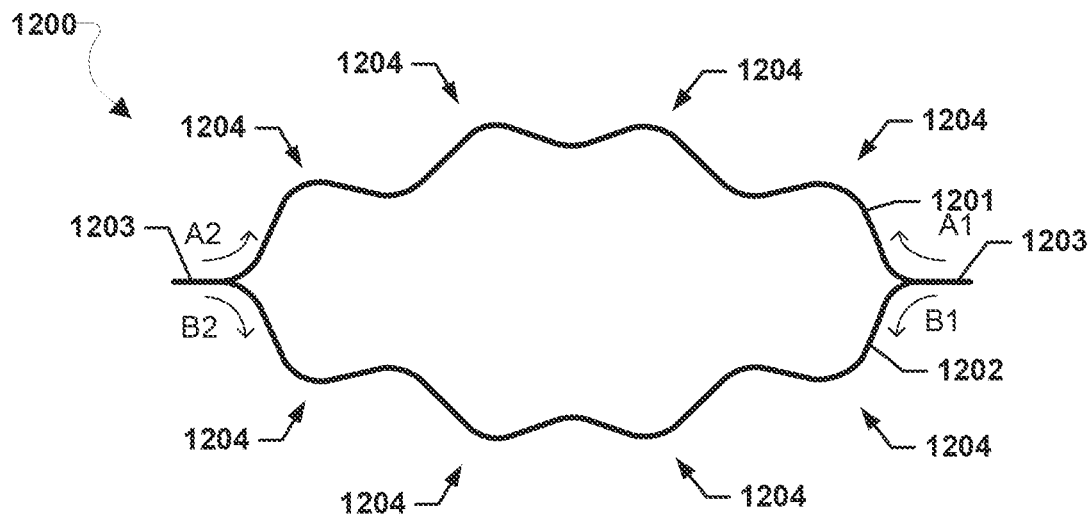
FIG. 12 is a diagram illustrating a cross-section of an example COROTUB geometry having four corrugations on both its first and second shells in a deployed configuration according to various embodiments.

FIG. 12 is a diagram illustrating a cross-section of an example COROTUB 1200 having four corrugations 1204 on both its first 1201 and second 1202 shells in a deployed configuration according to various embodiments. The shells 1201 and 1202 may be affixed together at two respective end web regions 1203. In the COROTUB 1200, the shell 1201 may be affixed to the shell 1202 only at the respective end web regions 1203. In this manner, the COROTUB 1200 may have only the two end web regions 1203 joining the shells 1201 and 1202 and the two end web regions 1203 may form the sole connection between the shells 1201 and 1202. In the COROTUB 1200 the webs may remain in the same plane when the COROTUB 1200 is collapsed or deployed (e.g., in a manner similar as that described above with reference to plane Y illustrated in FIGS. 2A and 2B for COROTUB 200). FIG. 12 illustrates the direction of angle A1 for the curvature of shell 1201 from one web 1203 being in a different sign direction from the direction of angle B1 for the curvature of shell 1202 from that same web 1203. Similarly, FIG. 12 illustrates the direction of angle A2 for the curvature of shell 1201 from one web 1203 being in a different sign direction from the direction of angle B2 for the curvature of shell 1202 from that same web 1203. Additionally, the curvature directions of A2 and B1 may be the same sign and the curvature directions of A1 and B2 may be same sign. FIG. 12 illustrates that the corrugations 1204 of the COROTUB 1200 may be non-circular segments, such as parabolic corrugations 1204. While parabolic corrugations are illustrated in FIG. 12, the corrugations according to various embodiments may be other shape corrugations, such as elliptical shape corrugations or any other non-circular shape corrugations.

Figure 13:
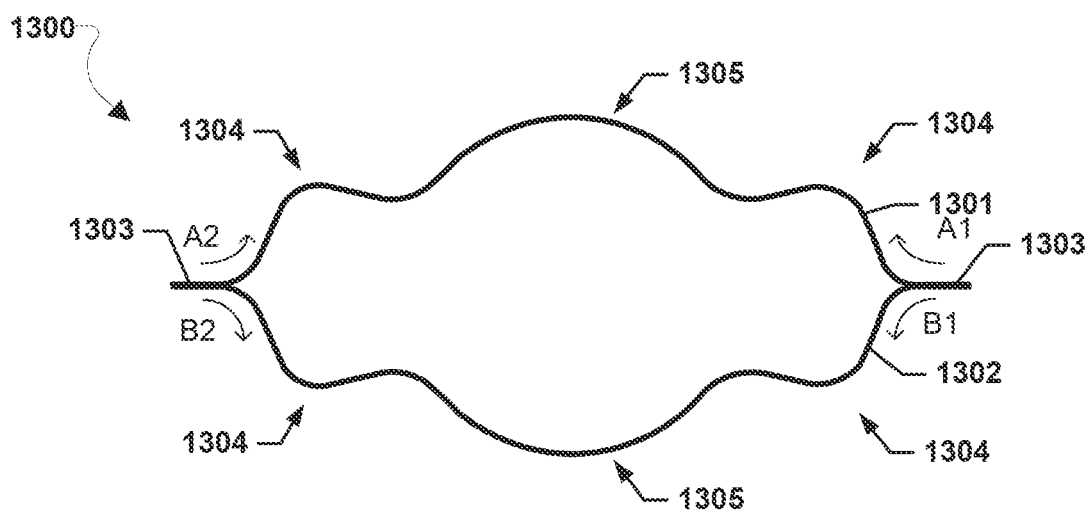
FIG. 13 is a diagram illustrating a cross-section of an example COROTUB geometry having three corrugations on both its first and second shells in a deployed configuration according to various embodiments.

FIG. 13 is a diagram illustrating a cross-section of an example COROTUB 1300 having three corrugations on first shell 1301 and second shell 1302 in a deployed configuration according to various embodiments. The corrugations may be different shape corrugations in the deployed configuration, such as two corrugations 1304 formed from parabolic shaped segments and one corrugation 1305 formed from a circular shaped segment. The shells 1301 and 1302 may be affixed together at two respective end web regions 1303. In the COROTUB 1300, the shell 1301 may be affixed to the shell 1302 only at the respective end web regions 1303. In this manner, the COROTUB 1300 may have only the two end web regions 1303 joining the shells 1301 and 1302 and the two end web regions 1303 may form the sole connection between the shells 1301 and 1302. In the COROTUB 1300 the webs may remain in the same plane when the COROTUB 1300 is collapsed or deployed (e.g., in a manner similar as that described above with reference to plane Y illustrated in FIGS. 2A and 2B for COROTUB 200). FIG. 13 illustrates the direction of angle A1 for the curvature of shell 1301 from one web 1303 being in a different sign direction from the direction of angle B1 for the curvature of shell 1302 from that same web 1303. Similarly, FIG. 13 illustrates the direction of angle A2 for the curvature of shell 1301 from one web 1303 being in a different sign direction from the direction of angle B2 for the curvature of shell 1302 from that same web 1303. Additionally, the curvature directions of A2 and B1 may be the same sign, and the curvature directions of A1 and B2 may be the same sign. While a combination of circular corrugations 1305 and parabolic corrugations 1304 are illustrated in FIG. 13 for the shells 1301 and 1302, the corrugations on any given shell in the various embodiments may be any combinations of two or more different shapes, such as parabolic, circular, and/or elliptical shape corrugations.

In various embodiments, the various shells of the COROTUBs described herein may be made from any material, such as Fiber Reinforced Plastics (FRPs), Carbon Fiber Reinforced Plastic (CFRP), Glass Fiber Reinforced Plastic (GRFP), or Kevlar Fiber Reinforced Plastic (KFRP), etc. In various embodiments, COROTUBs may be manufactured by affixing (e.g., joint, such as bonding, stitching, welding, etc., co-curing, or otherwise structurally affixing to one another) two shells together.

The resulting COROTUBs may be coiled around a spindle/drum (or itself) in a stored configuration and the two shells may flatten together in the stored or coiled (i.e., flattened) configuration. In the coiled configuration, the two shells may flatten together as in response to the two respective webs solely connecting the two shells moving apart from one another in the same plane. In a deployed configuration the shells may uncoil (i.e., straighten out) and press apart from one another (i.e., un-flatten) recovering their initial cross-section. For example, the COROTUBs of the various embodiments may be suitable for use in a boom deployment mechanism similar to the German Aerospace Center's (DLR) deployer for the GoSolar array system. Such deployment mechanism may include a spindle/drum around which the COROTUB is coiled and the COROTUB may be deployed through one or more boom bracing structures. As discussed herein, the outer shell of a COROTUB may be the shell that will be outward to the spindle/drum in the stored coiled configuration. As discussed herein, the inner shell of the COROTUB may be shell that will be inward to the spindle in the stored coiled configuration.

In some embodiments, the outer shell and inner shell may be formed from a same material. In some embodiments, the outer shell and inner shell may be formed from different materials. In various embodiments, the shells of a COROTUB may be formed from one or more composite laminates. For example, the shell may be formed from a single composite laminate, two or more different composite laminates, etc. As a specific example, the shells may be formed from a first composite laminate and a second composite laminate. As examples, the first composite laminate and/or the second composite laminate may be: a composite laminate of intermediate modulus (IM) unidirectional CFRP formed from MR60H carbon fiber and a PMT-F7 epoxy resin matrix; a composite laminate of plain weave IM CFRP formed from M30S carbon fiber and PMT-F7 resin; or any other type composite laminate. In various embodiments, the shells may be joined at the end web regions by an adhesive, such as an adhesive film formed from Hysol EA9696 or any other adhesive. In some embodiments, ply drops may be incorporated between the convex and concave segments and web radius to reduce boom coiled strain energy and material strain levels. In some embodiments, the convex sections of the shell may be formed from a first configuration of the first composite laminate and the second composite laminate, the concave and web radius sections of the shell may be formed from a second configuration of the first composite laminate and the second composite laminate, and the web portion may be formed from the third configuration of the first composite laminate, the second composite laminate, and the adhesive. In various embodiments, one or more of the various composite laminates forming the COROTUB may be bistable or otherwise configured to promote bistability and/or alternatively configured to be promote compliance.

Various embodiments may provide methods for fabricating a COROTUB, including providing an outer shell, providing an inner shell, and affixing the outer shell to the inner shell. The shells may be affixed, for example by joining (e.g., bonding, stitching, welding, etc.), co-curing, or otherwise structurally affixing the shells to one another.

In testing, the corrugated designs of the various embodiments were found to improve, by as much as 20%, the boom bending and axial strength and boom transition length from flat to deployed when compared to a state-of-the-art CTM boom alternative of the same size, for short bracing distances, such as those that would be required by small satellite applications. In addition, the corrugated designs of the various embodiments showed a comparable structural response for longer bracing supports.

COROTUBs of the various embodiments may provide benefits over CTM booms. Embodiment COROTUBs may represent improvements over CTMs for scalability (e.g., as a boom increases in length and cross-sectional size) due to the thin-wall shell corrugation of the embodiment COROTUBs (e.g., cross-sectional radius ($r_{sh}$) decreasing while thickness ($t_{sh}$) remains similar as cross-section scales up).

In comparison to CTM booms, the COROTUBs of the various embodiments may provide increased resistance to local buckling allowing higher bending moments at the root of the boom. This can also increase the load carrying capability of a COROTUB in comparison to a CTM boom while the COROTUB is being deployed and the root cross-sectional area is still partially developed.

In comparison to CTM booms, the COROTUBs of the various embodiments may provide reduced boom transition length from flat to deployed, which enables more compact deployment mechanisms to be used for COROTUBs and allows larger inertias exiting the deployer with the resultant increased load bearing capacity.

In comparison to CTM booms, the COROTUBs of the various embodiments may provide reduced boom shape deformation during prolonged stowage in a rolled or coiled configuration, i.e., the various embodiment COROTUBs may reduce the loss of dimensional stability after stowage in comparison to CTM booms. This has benefits in strain-energy driven deployment concepts and against flattening of the cross-section with the resultant decrease of load bearing capability and pointing accuracy that can be experienced by CTM booms.

In comparison to CTM booms, the COROTUBs of the various embodiments may provide reduced global manufacturing shape distortion, i.e., the various embodiment COROTUBs may reduce the loss of dimensional stability during fabrication in comparison to CTM booms due to the increased structural depth of the thin shells provided by the corrugations that reduce cure-induced deformations and residual stresses. Additionally, the corrugations of the COROTUB may make these structures insensitive to fabrication imperfections.

An analytical model with closed-form equations was created to fully define the cross-section of corrugated boom designs according to various embodiments from a series of geometrical input parameters. This allowed a parametric analysis, where two geometric variables were evaluated at a time to assess which parameters most influenced the cross-sectional area moments of inertia and torsional constant. The number of corrugations, flattened height of the boom, and concave and convex corrugation radii were varied to study the complete boom design space.

Finite element analyses of pure bending and compression load cases for several short boom designs (e.g., 1.22 m long fully-deployed booms), with a fully-developed (constant) cross-section of either the same size (e.g., flattened height) or similar inertia properties, were first carried out to efficiently study the design trade-off in detail and reveal physical behavior inherent to corrugated thin shells, such as COROTUBs of the various embodiments. For a given boom size determined by the flattened height, as the number of corrugations increases, the individual thin-shell segments of the boom become shallower and thus are more prone to local buckling when bending moments are applied to them. Deeper corrugations increased the local buckling loads (crimpling) of the thin-shell boom but reduced the area moment of inertia and thus the global buckling load of the beam-column member. Therefore, a compromise between designing for bending stiffness and bending strength should generally be reached based on the structural application or need. For example, with the parameters chosen in the study discussed above, if a balance between the two was sought, a boom design with the number of corrugations n=4 might be adopted. If large bending strength with moderate stiffness was desired, a boom design with n=3 would be preferred, and if large bending stiffness with moderate strength was desired, a boom design with n=5 would be adopted.

A complementary study concluded that for booms of similar moment of inertia properties as CTM booms, corrugated designs, such as COROTUBs of the various embodiments, can offer significant increases in bending strength, demonstrated as 55% and 13% in the y axis and z axis directions, and appreciable increases in axial strength (demonstrated as 13%), at the expense of an additional 20% boom packaged height and mass. The stiffness growth was more modest. If boom mass and the coiled volume, as related to the packaged height of the boom, is not critical, COROTUBs are a competitive design for large cross-section booms.

A second computational study evaluated the boom transition shape and the structural response of several 6 m long partially-deployed boom designs to uniaxial and distributed load cases, and also the effects of partially bracing the root of the boom were assessed. It was found that bracing length could greatly affect the strength and stiffness of this boom and was more critical for bending cases that promoted the onset of local web buckling at the root. Bracing type (as in the discrete number of clamps at the root) had no effect on stiffness but also impacted strength for loading cases and boundary conditions that promoted the onset of local web buckling at the root. The corrugated designs also improved, by as much as 20%, the boom bending and axial strength and boom transition length from flat to deployed when compared to the CTM boom alternative of the same size (flattened height), for short bracing distances required by small satellite applications. In addition, boom designs with a few, deep corrugations showed a comparable structural response for longer bracing supports. It was shown that for load cases that were particularly susceptible to local buckling, such as side loads in the direction of the web or even compression, the corrugations could redistribute the stresses concentrated around a locally buckled boom web to the adjacent corrugations, such that global boom buckling was delayed and occurred at a higher load, and it promoted a more stable post-buckled regime. This higher resistance to local buckling is what makes the corrugations an attractive feature. For large-scale boom designs of similar inertia properties, corrugated designs have been shown to improve modestly the boom axial and bending strength compared to CTM designs. If the coiled boom height is not of ultimate concern, COROTUBs can be considered a competitive design for large cross-section deployable booms that can withstand significant loads.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present approach is not intended to be limited to the embodiments shown herein but is to be accorded the widest scope consistent with the following claims and the principles and novel features disclosed herein.

What is claimed is:

1. A Corrugated Rollable Tubular Boom (COROTUB) having a coiled configuration and a deployed configuration, the COROTUB comprising:
    a first shell;
    a second shell, the first shell and the second shell each having two respective flat end regions ("webs") that remain in a same plane in both the coiled configuration and the deployed configuration, each of the webs define a start of an adjacent shell segment arc with a radius of curvature $r_w$ ("web radius") from a point located at a distance $R_w$ from the COROTUB center, wherein the first shell or the second shell includes two or more corrugations wherein at least one convex corrugation has a convex shell segment radius of curvature $r_v$ from a corrugation center point on a first curve located $R_i$ from the COROTUB center and at least one concave corrugation has a concave shell segment radius of curvature $r_c$ from a corrugation center point on a second curve located $R_o$ from the COROTUB center, the webs having a predetermined web length w, and wherein:
    the COROTUB has a predetermined flattened boom height h along a vertical axis;
    the first shell is only affixed to the second shell at the webs;
    the first shell and the second shell curve away from the webs in different directions of curvature in the deployed configuration;
    the first shell and the second shell flatten together in the coiled configuration in response to the webs moving apart from one another in the same plane.

2. The COROTUB of claim 1, wherein:
    the first shell has at least two corrugations; and
    the second shell has at least two corrugations.

3. The COROTUB of claim 2, wherein the first shell and the second shell have the same number of corrugations.

4. The COROTUB of claim 2, wherein the first shell and the second shell have a different number of corrugations.

5. The COROTUB of claim 2, wherein the corrugations of the first shell or the corrugations of the second shell are non-circular shape corrugations.

6. The COROTUB of claim 2, wherein the corrugations of the first shell or the corrugations of the second shell are a combination of two or more different shape corrugations.

7. The COROTUB of claim 5, wherein the first shell has circular shape corrugations and the second shell has non-circular shape corrugations.

8. The COROTUB of claim 5, wherein the non-circular corrugation shape is an ellipsoidal shape, or a parabolic shape.

9. The COROTUB of claim 1, wherein the COROTUB is configured to have an axial curvature in the deployed configuration.

10. The COROTUB of claim 1, wherein:
    the first shell is comprised of a first composite laminate; and
    the second shell is comprised of a second composite laminate.

11. The COROTUB of claim 10, wherein the first composite laminate is different than the second composite laminate.

12. The COROTUB of claim 1, wherein the first shell includes at least two corrugations having convex segments forming equal sense portions of the first shell.

13. A Corrugated Rollable Tubular Boom (COROTUB) having a coiled configuration and a deployed configuration, the COROTUB comprising:
    a first corrugated shell half; and
    a second corrugated shell half, the first corrugated shell half and the second corrugated shell half having three or more corrugations in a cross-section of the COROTUB in the deployed configuration, each of the webs define a start of an adjacent shell segment arc with a radius of curvature $r_w$ ("web radius") from a point located at a distance $R_w$ from the COROTUB center, wherein the first shell or the second shell includes two or more corrugations wherein at least one convex corrugation has a convex shell segment radius of curvature $r_w$ from a corrugation center point on a first circle located at a radius $R_i$ from the COROTUB center and at least one concave corrugation has a concave shell segment radius of curvature $r_c$ from a corrugation center point on a second circle located at a radius $R_o$ from the COROTUB center, the webs having a predetermined web length w, and wherein:
    the COROTUB has a predetermined flattened boom height h along a vertical axis;

the first corrugated shell half is only affixed to the second corrugated shell half at two respective flat end web regions ("webs") of the respective first corrugated shell half and the second corrugated shell half, the first corrugated shell half and the second corrugated shell half curving away from each of the webs in different directions of curvature in the deployed configuration, the two respective webs remaining in a same plane in the coiled configuration and the deployed configuration;

the first corrugated shell half and the second corrugated shell half flatten together in the coiled configuration in response to the webs moving apart from one another in the same plane;

wherein $\pi/2=\gamma+\beta+\phi(n-1)$, where $\gamma$ is an angle between the vertical axis and the center of the web adjacent shell segment, $\beta$ is an angle between $\gamma$ and the center of the at least one convex corrugation, and $\phi$ is an angle between $\beta$ and a center of any remaining convex or concave corrugation that is repeated as n−1 time where n is a predetermined number of the two or more corrugations; and wherein the flattened boom height h relates to the web length w and the various shell segments by $h=2[w+(r_w+r_v)\alpha_w+(r_v+r_c)\Sigma_{k-1}^{n-1}\alpha_k]$, where $\alpha_w$ is a subtended angle of a web segment arc, and $\alpha_k$ is a subtended angle of shell segment at a corrugation.

14. The COROTUB of claim 13, wherein the first corrugated shell half is comprised of a first composite laminate and a second composite laminate different from the first composite laminate; and the second corrugated shell half is comprised of a third composite laminate and a fourth composite laminate different from the third composite laminate.

15. The COROTUB of claim 13, wherein:

the first corrugated shell half has at least three corrugations; and the second corrugated shell half has at least three corrugations.

16. The COROTUB of claim 15, wherein the at least three corrugations of the first corrugated shell half or the at least three corrugations of the second corrugated shell half are non-circular shape corrugations.

17. The COROTUB of claim 15, wherein:

the three or more corrugations of the first corrugated shell half or the three or more corrugations of the second corrugated shell half are a combination of two or more different shape corrugations.

18. A rollable tubular boom having a coiled configuration and a deployed configuration, the boom comprising:

a first shell;

a second shell, respective edges of the first shell and the second shell half including flat end regions ("webs") such that the first shell and the second shell each have two respective webs, the webs remaining in a same plane in the coiled configuration and the deployed configuration, each of the webs define a start of an adjacent shell segment arc with a radius of curvature $r_w$ ("web radius") from a point located at a distance $R_w$ from the COROTUB center, wherein one or both of the first shell and the second shell includes at least two corrugations extending between the webs, wherein the at least two corrugations comprise at least one convex corrugation having a convex shell segment radius of curvature $r_w$ from a corrugation center point on a first circle located at a radius $R_i$ from the rollable tubular boom center and at least one concave corrugation having a concave shell segment radius of curvature $r_c$ from a corrugation center point on a second circle located at a radius $R_o$ from the rollable tubular boom center, the webs having a predetermined web length w, and, wherein:

the boom has a predetermined flattened boom height h along a vertical axis;

the first shell is only affixed to the second shell at the webs of the first shell and the second shell, the first shell and the second shell curving away from each of the webs in different directions of curvature in the deployed configuration;

the first shell and the second shell flatten together in the coiled configuration in response to the webs moving apart from one another in the same plane;

wherein $\pi/2=\gamma+\beta+\phi(n-1)$, where $\gamma$ is an angle between the vertical axis and the center of the web adjacent shell segment, $\beta$ is an angle between $\gamma$ and the center of the at least one convex corrugation, and $\phi$ is an angle between $\beta$ and a center of any remaining convex or concave corrugation that is repeated as n−1 time where n is a predetermined number of the two or more corrugations; and wherein the flattened boom height h relates to the web length w and the various shell segments by $h=2[w+(r_w+r_v)\alpha_w+(r_v+r_c)\Sigma_{k-1}^{n-1}\alpha_k]$, where $\alpha_w$ is a subtended angle of a web segment arc, and $\alpha_k$ is a subtended angle of shell segment at a corrugation; and the first shell and the second shell are configured such that the boom has an axial curvature in the deployed configuration.

19. The boom of claim 18, wherein the boom is a Corrugated Rollable Tubular Boom (COROTUB).

20. The COROTUB of claim 1, wherein the first shell and the second shell each include five corrugations.

* * * * *